(12) United States Patent
Miller et al.

(10) Patent No.: US 11,518,381 B2
(45) Date of Patent: Dec. 6, 2022

(54) ENHANCED THREAT SELECTION

(71) Applicant: Ford Global Technologies, LLC, Dearborn, MI (US)

(72) Inventors: Alex Maurice Miller, Canton, MI (US); Christopher Pontisakos, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 340 days.

(21) Appl. No.: 16/540,105

(22) Filed: Aug. 14, 2019

(65) Prior Publication Data
US 2021/0046927 A1    Feb. 18, 2021

(51) Int. Cl.
*B60W 30/095*    (2012.01)
*B60W 30/09*    (2012.01)
*B60W 10/18*    (2012.01)
*B60W 10/20*    (2006.01)
*B60W 10/04*    (2006.01)

(52) U.S. Cl.
CPC ........ *B60W 30/0953* (2013.01); *B60W 10/04* (2013.01); *B60W 10/18* (2013.01); *B60W 10/20* (2013.01); *B60W 30/09* (2013.01); *B60W 2554/801* (2020.02); *B60W 2554/802* (2020.02); *B60W 2710/18* (2013.01); *B60W 2710/20* (2013.01); *B60W 2720/106* (2013.01)

(58) Field of Classification Search
None
See application file for complete search history.

(56) References Cited

U.S. PATENT DOCUMENTS

| | | | |
|---|---|---|---|
| 8,706,393 B2 | 4/2014 | Miller et al. | |
| 9,523,984 B1 * | 12/2016 | Herbach | G05D 1/0088 |
| 10,232,849 B2 | 3/2019 | Liu et al. | |
| 10,829,113 B2 * | 11/2020 | Liu | B60W 50/14 |
| 2018/0061253 A1 * | 3/2018 | Hyun | G08G 1/0175 |
| 2018/0201258 A1 | 7/2018 | Luo et al. | |
| 2018/0208186 A1 * | 7/2018 | Liu | B60W 30/09 |
| 2019/0120951 A1 * | 4/2019 | Fischer | G01S 13/04 |
| 2020/0114910 A1 * | 4/2020 | Han | B60W 30/18163 |
| 2020/0238991 A1 * | 7/2020 | Aragon | B60W 50/14 |

FOREIGN PATENT DOCUMENTS

| | | | |
|---|---|---|---|
| EP | 0433351 B1 | 2/1994 | |
| EP | 3217357 A1 | 9/2017 | |
| JP | 2016164031 A * | 9/2016 | |

* cited by examiner

*Primary Examiner* — Genna M Mott
(74) *Attorney, Agent, or Firm* — Frank A. MacKenzie; Bejin Bieneman PLC

(57) ABSTRACT

A computer includes a processor and a memory, the memory storing instructions executable by the processor to predict a heading angle of a target vehicle, determine a distance between a host vehicle and a center line of the target vehicle based on the predicted heading angle, and perform a threat assessment for the target vehicle when the distance is below a threshold.

14 Claims, 4 Drawing Sheets

ENHANCED THREAT SELECTION

BACKGROUND

Vehicle collisions can occur at intersections of roadways. A vehicle can detect a target vehicle at the intersection. Collision mitigation, including assessing a threat posed to a host vehicle by a target vehicle may be difficult and expensive to implement. For example, determining a threat assessment on the target vehicle can require data from a plurality of sensors.

DETAILED DESCRIPTION

Figure 1:
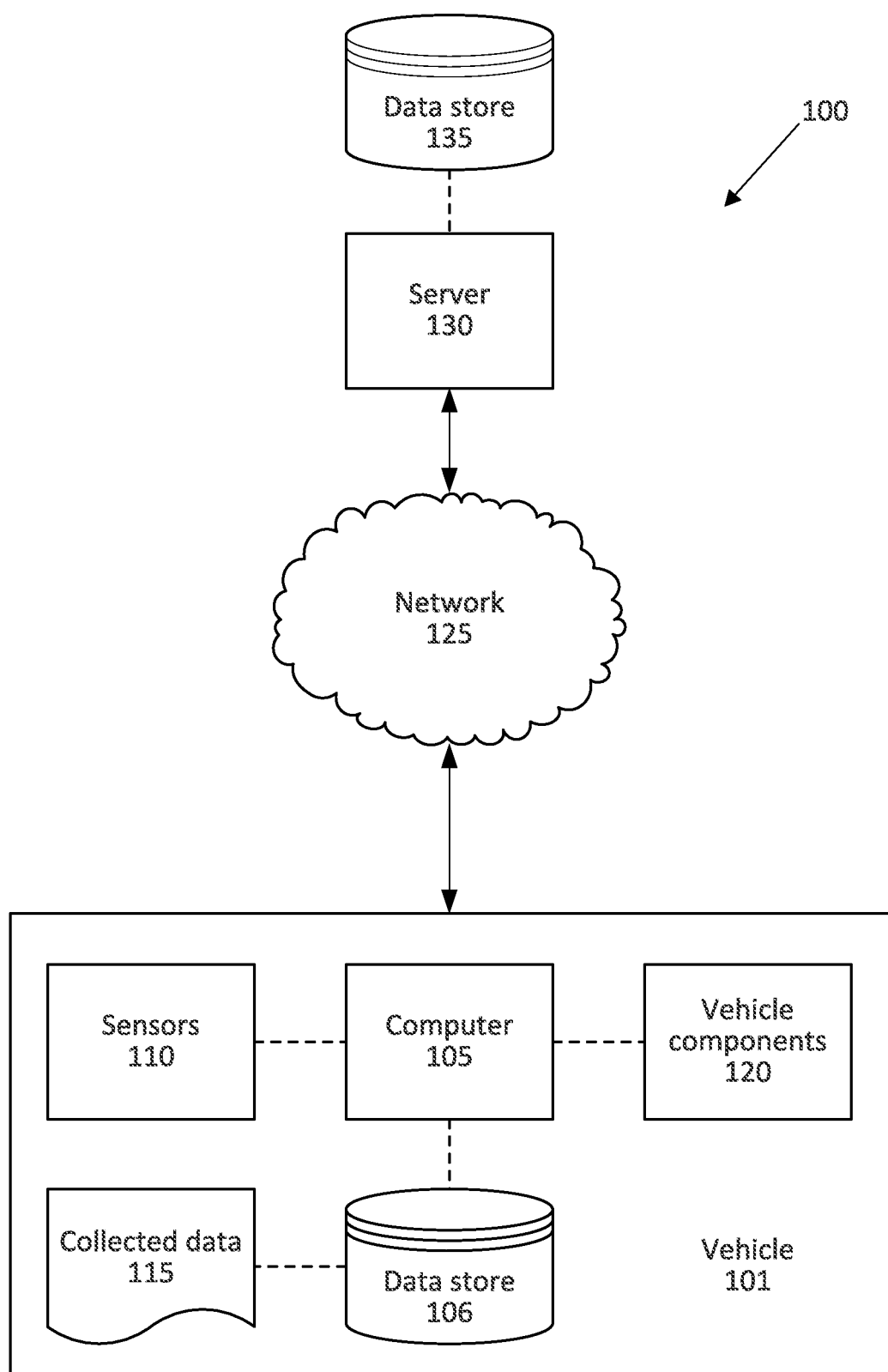
FIG. 1 is a block diagram of an example system for collision mitigation.

A computer includes a processor and a memory, the memory storing instructions executable by the processor to predict a heading angle of a target vehicle, determine a distance between a host vehicle and a center line of the target vehicle based on the predicted heading angle, and perform a threat assessment for the target vehicle when the distance is below a threshold.

The instructions can further include instructions to determine a lateral distance between the host vehicle and a lateral center line of the target vehicle and a longitudinal distance between the host vehicle and a longitudinal center line of the target vehicle and to perform the threat assessment when the lateral distance is below a lateral distance threshold and the longitudinal distance is below a longitudinal distance threshold.

The lateral center line and the longitudinal center line can intersect at a center of the target vehicle.

The instructions can further include instructions to determine respective distances between a plurality of points on the host vehicle and the center line of the target vehicle.

The plurality of points can be corner points of the host vehicle.

The instructions can further include instructions to perform the threat assessment when at least one of the plurality of points has a respective distance that is below the threshold.

The instructions can further include instructions to identify a plurality of target vehicles, to determine respective distances between the host vehicle and each of the plurality of target vehicles, and to perform threat assessments on target vehicles having distances below the threshold.

The instructions can further include instructions to predict a lateral distance between the host vehicle and the target vehicle and a longitudinal distance between the host vehicle and the target vehicle and to determine the distance to the center line based on the predicted lateral distance and the predicted longitudinal distance.

The instructions can further include instructions to, upon performing the threat assessment, actuate one or more components of the host vehicle to avoid the target vehicle.

The instructions can further include instructions to determine the threshold based on at least one of a width of the target vehicle or a length of the target vehicle.

A method includes predicting a heading angle of a target vehicle, determining a distance between a host vehicle and a center line of the target vehicle based on the predicted heading angle, and performing a threat assessment for the target vehicle when the distance is below a threshold.

The method can further include determining a lateral distance between the host vehicle and a lateral center line of the target vehicle and a longitudinal distance between the host vehicle and a longitudinal center line of the target vehicle and to perform the threat assessment when the lateral distance is below a lateral distance threshold and the longitudinal distance is below a longitudinal distance threshold.

The method can further include determining respective distances between a plurality of points on the host vehicle and the center line of the target vehicle.

The method can further include performing the threat assessment when at least one of the plurality of points has a respective distance that is below the threshold.

The method can further include identifying a plurality of target vehicles, determining respective distances between the host vehicle and each of the plurality of target vehicles, and performing threat assessments on target vehicles having distances below the threshold.

The method can further include predicting a lateral distance between the host vehicle and the target vehicle and a longitudinal distance between the host vehicle and the target vehicle and determining the distance to the center line based on the predicted lateral distance and the predicted longitudinal distance.

The method can further include, upon performing the threat assessment, actuating one or more components of the host vehicle to avoid the target vehicle.

The method can further include determining the threshold based on at least one of a width of the target vehicle or a length of the target vehicle.

A system includes a host vehicle including a brake, a steering component, and a propulsion, means for predicting a heading angle of a target vehicle, means for determining a distance between the host vehicle and a center line of the target vehicle based on the predicted heading angle, means for performing a threat assessment for the target vehicle when the distance is below a threshold, and means for actuating at least one of the brake, the steering component, and the propulsion based on the threat assessment.

The system can further include means for determining a lateral distance between the host vehicle and a lateral center line of the target vehicle and a longitudinal distance between the host vehicle and a longitudinal center line of the target vehicle and performing the threat assessment when the lateral distance is below a lateral distance threshold and the longitudinal distance is below a distance longitudinal threshold.

The system can further include means for determining respective distances between a plurality of points on the host vehicle and the center line of the target vehicle.

The system can further include means for performing the threat assessment when at least one of the plurality of points has a respective distance that is below the threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Computation time and resources for mitigating collisions can be costly (i.e., can consume significant processor time and/or memory) for vehicle computers. Prioritizing target vehicles that are mostly likely to collide with a host vehicle can reduce overall computational costs for the host vehicle computer. Using dimensions of the target vehicles, such as a length and a width of the target vehicles, allows for the host vehicle to specify distance thresholds around the target vehicles to determine whether to perform threat assessments. The distance thresholds form a bounding box around the target vehicle, and the host vehicle computer can select the target vehicle for threat assessment when a portion of the host vehicle is within the bounding box. Using a relative heading angle between the host vehicle and the target vehicles, the host vehicle computer can determine respective lateral and longitudinal distances between a coordinate system of the host vehicle and a coordinate system of the target vehicle. The host vehicle computer can use these lateral and longitudinal distances to determine whether to select the target vehicle for threat assessment. By predicting the distances based on predicted heading angles, the host vehicle computer can determine whether, for a specified future time, the computer should select the target vehicle for threat assessment.

FIG. 1 illustrates an example system 100 for collision mitigation. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
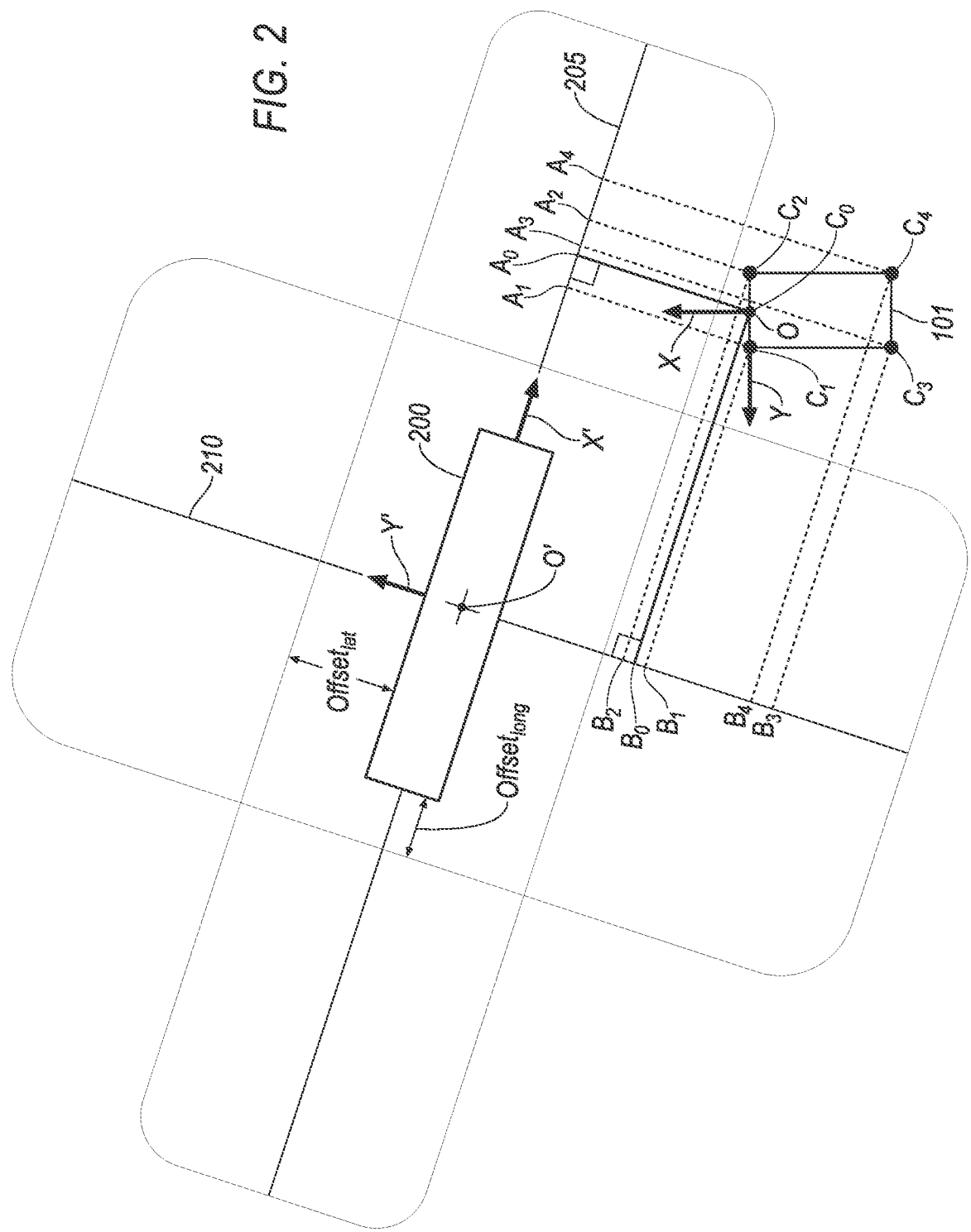
FIG. 2 is a plan view of an example host vehicle and an example target vehicle.

FIG. 2 is a plan view of a host vehicle 101 and a target vehicle 200. The host vehicle 101 can detect the target vehicle 200 by actuating one or more sensors 110 and collecting data 115 about the target vehicle 200. For example, the computer 105 can actuate a camera 110 that collects image data 115 and can process the image data 115 with a conventional technique (e.g., Canny edge detection) to identify the target vehicle 200.

A computer 105 in the vehicle 101 defines a coordinate system, e.g., a two-dimensional rectangular coordinate system. The coordinate system defines a longitudinal direction X and a lateral direction Y and an origin at a center point O of the host vehicle 101. The longitudinal direction X is a vehicle-forward direction, i.e., the direction in which a propulsion 120 moves the vehicle 101 when a steering component 120 is at a neutral position. The lateral direction Y is perpendicular to the longitudinal direction X.

The target vehicle 200 defines a target coordinate system, e.g., a two-dimensional rectangular coordinate system. The target coordinate system defines a longitudinal direction X' and a lateral direction Y' and an origin at a center point O' of the target vehicle 200. The computer 105 can identify a center line of the target vehicle 200. The "center line" is a line extending through a center point of the target vehicle 200 along one of a longitudinal axis X' or a lateral axis Y' of the target vehicle 200. That is, the target vehicle 200 defines a lateral center line 205 along the longitudinal axis X' and a longitudinal center line 210 along the lateral axis Y'. The lateral center line 205 and the longitudinal center line 210 intersect at the center point O' of the target vehicle 200.

The computer 105 can identify a longitudinal distance threshold and a lateral distance threshold around the target vehicle 200. The longitudinal distance threshold is a distance along the longitudinal axis X' from the center point O' of the target vehicle 200. If the host vehicle 101 is within the longitudinal distance threshold, the computer 105 can perform a threat assessment for the target vehicle 200. The lateral distance threshold is a distance along the lateral axis Y' from the center point O'. If the host vehicle 101 is within the longitudinal distance threshold, the computer 105 can perform a threat assessment for the target vehicle 200. That is, if the host vehicle 101 is within one or both of the longitudinal distance threshold and the lateral distance threshold, the computer 105 can perform a threat assessment for the target vehicle 200. The longitudinal distance threshold can be half the target length $T_{length}$ and an additional offset $Offset_{long}$ that is determined based on empirical testing and/or simulation testing of a virtual host vehicle 101 and a virtual target vehicle 200. The lateral distance threshold can be half the target vehicle width $T_{width}$ and an additional offset $Offset_{lat}$ that is determined based on empirical testing and/or simulation testing of a virtual host vehicle 101 and a virtual target vehicle 200.

The computer 105 can determine a distance between a point on the host vehicle 101 and the center line of the target vehicle 200. The point on the host vehicle 101 is a location on a surface of the host vehicle 101, e.g., on a front bumper of the host vehicle 101, on a rear bumper of the host vehicle 101, on a door of the host vehicle 101, etc. The computer 105 can determine a lateral distance between the point on the host vehicle 101 and the lateral center line 205 of the target vehicle 200. The computer 105 can determine a longitudinal distance between the point on the host vehicle 101 and the longitudinal center line 210 of the target vehicle 200. When the lateral distance is within the lateral distance threshold of the lateral center line 205 and/or the longitudinal distance is within the longitudinal distance threshold of the longitudinal center line 210, the computer 105 can perform a threat assessment for the target vehicle 200.

The computer 105 can determine respective lateral and longitudinal distances for a plurality of points on the host vehicle 101 and can perform the threat assessment for the target vehicle 200 when at least one of the lateral and/or longitudinal distances are within respective lateral and longitudinal distance thresholds. The plurality of points can include corner points of the host vehicle 101. For example, as shown in FIG. 2, the computer 105 can identify a center point $C_0$ of a front bumper and four corner points $C_1, C_2, C_3, C_4$. Each point $C_0, C_1, C_2, C_3, C_4$ defines respective lateral distances to the lateral center line 205 in the target vehicle 200 coordinate system, represented by points $A_0, A_1, A_2, A_3, A_4$, and longitudinal distances to the longitudinal center line 210 in the target vehicle 200 coordinate system, represented by points $B_0, B_1, B_2, B_3, B_4$. In the example of FIG. 2, none of the points $A_0, A_1, A_2, A_3, A_4$ or $B_0, B_1, B_2, B_3, B_4$ is within the respective lateral and longitudinal distance thresholds, and the computer 105 determines not to perform a threat assessment for the target vehicle 200. Alternatively, the plurality of points can include a different point on the target vehicle 200, e.g., a point between two of the corner points.

Figure 3:
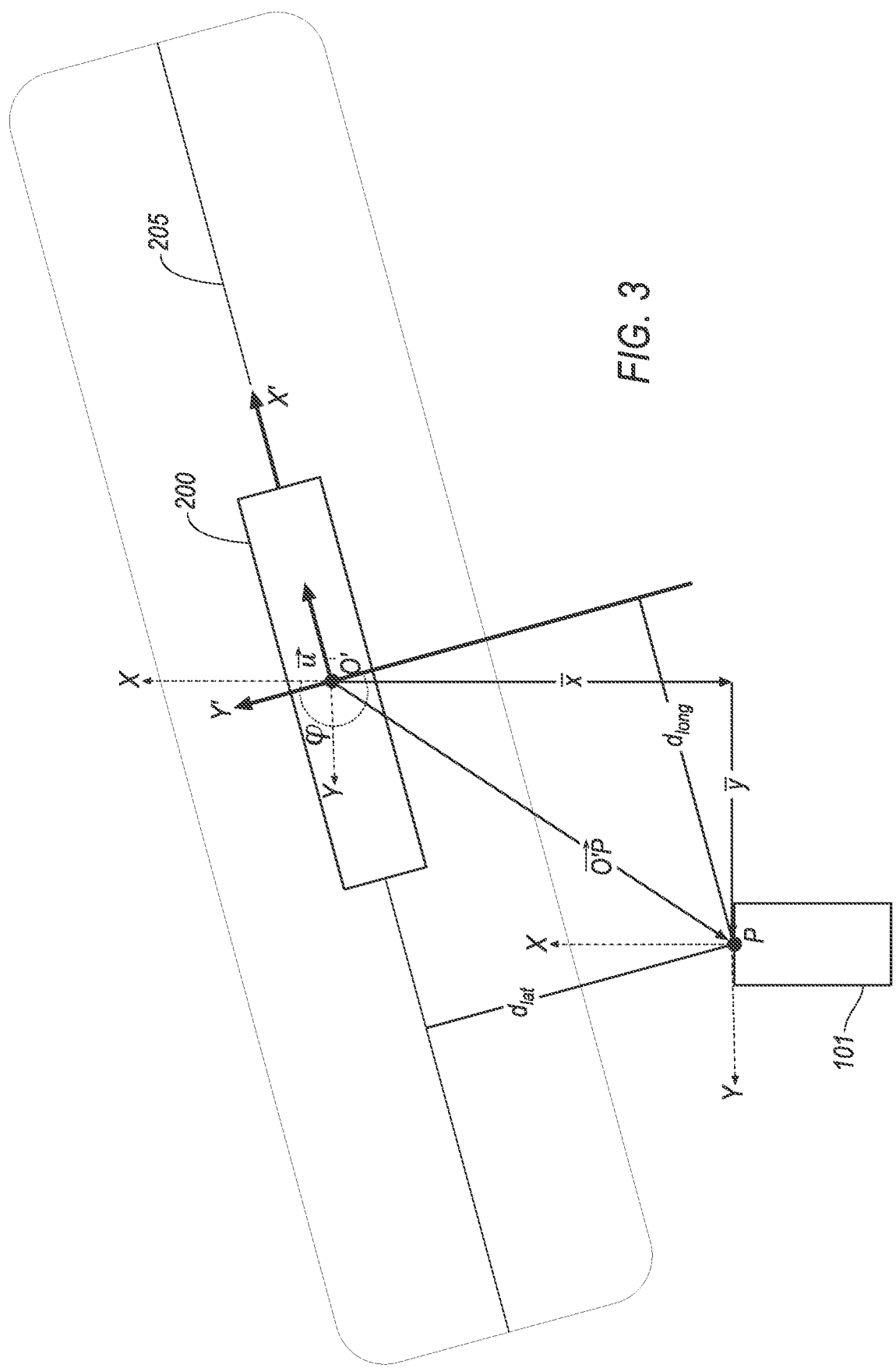
FIG. 3 is a plan view of the example host vehicle and the example target vehicle.

FIG. 3 is a plan view of the host vehicle 101 and the target vehicle 200 illustrating the distances between a point on the host vehicle 101 and the center lines 205, 210 of the target vehicle 200. The computer 105 can predict a heading angle $\varphi$ of the target vehicle 200. In this context, the "heading angle" is the angle defined between the longitudinal axis X' of the target vehicle 200 and the longitudinal axis X of the host vehicle 101. That is, the heading angle $\varphi$ is a predicted angular difference in the forward trajectories of the host vehicle 101 and the target vehicle 200. The computer 105 can predict a plurality of heading angles $\varphi$ for a plurality of timesteps, e.g., 0.1 seconds, up to a predetermined period of time, e.g., 3.0 seconds. The timesteps and predetermined period of time can be determined based on, e.g., sensor 110 data collection time, computer 105 data processing speed, empirical testing of host vehicles 101 and target vehicles 200 in intersections, etc. The heading angle $\varphi$ defines a unit vector $\vec{u}$ along the longitudinal axis X' of the target vehicle 200.

The computer 105 can define a vector $\overrightarrow{O'P}$ between the point P on the host vehicle 101 and the center O' of the target vehicle 200. The vector $\overrightarrow{O'P}$ is the straight-line distance between the point P and the center O'. The vector $\overrightarrow{O'P}$ has components $\bar{x}$ along the longitudinal axis X of the host vehicle 101 and $\bar{y}$ along the lateral axis Y of the host vehicle 101. The computer 105 can determine the components $\bar{x}, \bar{y}$ based on a conventional kinematic model, e.g., a Constant Turn Rate Acceleration vehicle model.

The component of the vector $\overrightarrow{O'P}$ along the longitudinal axis X' of the target vehicle 200 is the longitudinal distance $d_{long}$ from the point P to the longitudinal center line 210 of the target vehicle 200. The component of the vector $\overrightarrow{O'P}$ along the lateral axis Y' of the target vehicle 200 is the lateral distance $d_{lat}$ from the point P to the lateral center line 205 of the target vehicle 200. To determine the distances $d_{long}, d_{lat}$, the computer 105 converts the components $\bar{x}, \bar{y}$ into the target vehicle 200 coordinate system with the heading angle $\varphi$:

$$d_{long} = \left| -\bar{y}\cos\left(\varphi + \frac{\pi}{2}\right) + \bar{x}\sin\left(\varphi + \frac{\pi}{2}\right) \right| \quad (1)$$

$$d_{lat} = \left| -\bar{y}\cos(\varphi) + \bar{x}\sin(\varphi) \right| \quad (2)$$

The computer 105 performs a threat assessment for the target vehicle 200 when at least one of the longitudinal distance $d_{long}$ or the lateral distance $d_{lat}$ is below a respective longitudinal distance threshold or a lateral distance threshold. The computer 105 can predict the longitudinal distance $d_{long}$ and the lateral distance $d_{lat}$ for a predetermined period of time (e.g., 3 seconds) based on the predicted heading angles φ, as described above. When at least one of the predicted longitudinal distances $d_{long}$ or one of the predicted lateral distances $d_{lat}$ is below a respective threshold, the computer 105 can perform a threat assessment for the target vehicle. The threat assessment can be determining a threat number, as described below. The computer 105 can perform the threat assessment for the target vehicle 200 when both the longitudinal distance $d_{long}$ and the lateral distance $d_{lat}$ are below their respective thresholds within the predetermined period of time. That is, the computer 105 can perform the threat assessment only when the point P on the host vehicle 101 is predicted to be within both distance thresholds of the target vehicle 200, reducing the number of target vehicles 200 selected for threat assessment to those that satisfy both thresholds.

The threat assessment can be a threat number. That is, the computer 105 can determine a threat number TN for the target vehicle 200. A threat number is a prediction of whether a specific target vehicle 200 will intersect or collide with the host vehicle 101. Specifically, the computer 105 may determine an acceleration threat number ATN, a brake threat number BTN, and a steering threat number STN for the host vehicle 101 and the target vehicle 200, and based on the threat numbers ATN, BTN, STN, which may be combined into a single threat number TN, to actuate components 120.

The BTN is a measure of a needed longitudinal deceleration to allow the host vehicle 101 to stop before colliding with the target vehicle 200. The BTN can be based on a measured host vehicle 101 speed, a distance between the target vehicle 200 and the host vehicle 101, and the respective projected trajectories of the target vehicle 200 and the host vehicle 101. The computer 105 can determine a longitudinal deceleration to stop the host vehicle 101 before colliding with the target vehicle 200, e.g., 2 m/s². The computer 105 can determine a maximum deceleration of the host vehicle 101, e.g., 8 m/s². The BTN can be the ratio of the needed deceleration to the maximum deceleration, e.g., BTN=2/8=0.25. If the needed deceleration to avoid a collision with the target vehicle 200 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target vehicle 200. For example, the STN can be a measure of the lateral acceleration to steer the host vehicle 101 away from the target vehicle 200 in a direction opposite to a direction of travel of the host vehicle 101. That is, when the host vehicle 101 is in a left-hand turn, the STN is based on the lateral acceleration to steer the host vehicle 101 to the right away from the target vehicle 200. As with the BTN, the computer 105 can determine a needed lateral acceleration to avoid a collision between the host vehicle 101 and the target vehicle 200. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target vehicle 200. As described above for the BTN and the STN, the computer 105 can determine a needed acceleration to allow the host vehicle 101 to pass the target vehicle 200 and a maximum available acceleration of the host vehicle 101. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective overall threat number TN for the target vehicle 200.

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. The thresholds can be determined as, e.g., specifications from a manufacturer, results of simulation testing of virtual host vehicle and virtual target vehicle trajectories, empirical testing of vehicle components 120 during a collision test, etc. For example, if the threat number TN is above 0.7, the computer 105 can actuate a brake 120 to decelerate the host vehicle 101, e.g., at −6.5 meters per second squared (m/s²). In another example, if the threat number TN is above 0.4 but less than or equal to 0.7, the computer 105 can actuate the brake 120 to, e.g., a deceleration of −2.0 m/s². In another example, if the threat number TN is greater than 0.2 but less than or equal to 0.4, the computer 105 can display a visual warning on a host vehicle 101 human-machine interface and/or play an audio warning over a speaker.

The computer 105 can perform a collision avoidance action based on the threat number. In this context, a "collision avoidance action" is an action including actuation of one or more components 120 to avoid and/or mitigate a collision with the target vehicle 200. The collision avoidance action can include, e.g., providing a forward collision warning on a display screen in an interior of the vehicle 101, actuating a brake 120 to stop the host vehicle 101, actuating a propulsion 120 to avoid the target vehicle 200, actuating a steering component 120 to avoid the target vehicle 200, etc., as described above.

The computer 105 can identify a plurality of target vehicles 200 and determine respective distances between the host vehicle 101 and each of the plurality of target vehicles 200. Based on the distances, the computer 105 can to perform threat assessments on each of the target vehicles 200 having distances below the threshold. Upon performing the threat assessments, the computer 105 can perform collision avoidance actions to avoid the target vehicles 200.

Figure 4:
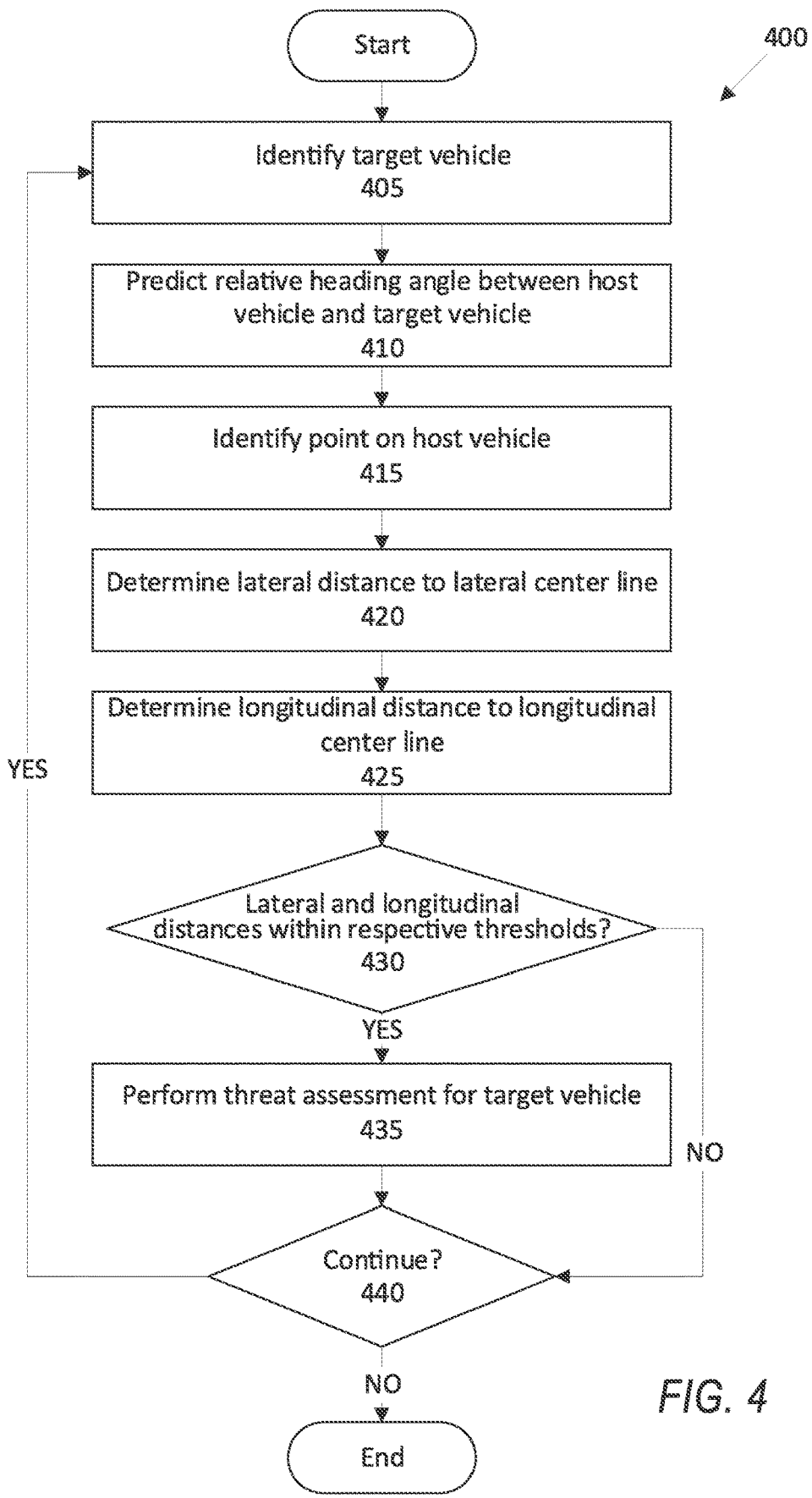
FIG. 4 is a block diagram of an example process for collision mitigation.

FIG. 4 is a block diagram of an example process 400 for collision mitigation. The process 400 begins in a block 405, in which a computer 105 of a host vehicle 101 identifies a target vehicle 200. The computer 105 can identify the target vehicle 200 based on data 115 collected by one or more sensors 110 of the host vehicle 101. For example, the computer 105 can actuate a camera 110 to collect image data 115 and identify the target vehicle 200 with a conventional image-detection technique, e.g., Canny edge detection.

Next, in a block 410, the computer 105 predicts a relative heading angle φ between the host vehicle 101 and the target vehicle 200. As described above, the computer 105 can predict the relative heading angle φ based on data 115 collected about the target vehicle 200, e.g., speed, position, acceleration, etc. The computer 105 can input the data 115 to a conventional vehicle kinetic model, e.g., a Constant Turn Rate and Acceleration (CTRA) vehicle model. The computer 105 can predict the relative heading angle φ at timesteps (e.g., 0.1 seconds) for a predetermined period of time (e.g., 3.0 seconds), as described above.

Next, in a block 415, the computer 105 identifies one or more points P on the host vehicle 101. As described above, when the distance from the point P of the host vehicle 101 is within a distance threshold of the target vehicle 200, the host vehicle 101 may collide with the target vehicle 200 and the computer 105 can perform a threat assessment for the target vehicle 200. The point P can be, e.g., a corner point, a center point of a front bumper, etc. The computer 105 can identify a plurality of points P, as described above and shown in FIG. 2.

Next, in a block 420, the computer 105 determines a lateral distance $d_{lat}$ between the point P and a lateral center line 205 of the target vehicle 200. As described above, the lateral distance $d_{lat}$ is the distance along the lateral axis Y' of the target vehicle 200 to the lateral center line 205 of the target vehicle 200. The computer 105 determines the lateral distance $d_{lat}$ based on the heading angle φ. The computer 105 can predict a plurality of lateral distances $d_{lat}$ over the time period based on the predicted heading angles φ.

Next, in a block 425, the computer 105 determines a longitudinal distance $d_{long}$ between the point P and a longitudinal center line 210 of the target vehicle 200. As described above, the longitudinal distance $d_{long}$ is the distance along the longitudinal axis X' of the target vehicle 200 to the longitudinal center line 210 of the target vehicle 200. The computer 105 determines the longitudinal distance $d_{long}$ based on the heading angle φ. The computer 105 can predict a plurality of longitudinal distances $d_{long}$ over the time period based on the predicted heading angles φ.

Next, in a block 430, the computer 105 determines whether the lateral distance $d_{lat}$ is within a lateral distance threshold and the longitudinal distance $d_{long}$ is within a longitudinal distance threshold. As described above, when both the lateral distance $d_{lat}$ and the longitudinal distance $d_{long}$ are within respective thresholds, the point P is within an area around the target vehicle 200 where a collision is likely. The computer 105 can determine whether, at any timestep in the time period, both the lateral distance $d_{lat}$ and the longitudinal distance $d_{long}$ are within respective thresholds. If the lateral distance $d_{lat}$ and the longitudinal distance $d_{long}$ are within respective thresholds, the process 400 continues in a block 435. Otherwise, the process 400 continues in a block 440. Alternatively, the process 400 can continue in the block 435 when one of the lateral distance $d_{lat}$ or the longitudinal distance $d_{long}$ is within its respective distance threshold at any timestep in the time period.

In the block 435, the computer 105 performs a threat assessment for the target vehicle 200. As described above, the threat assessment can be determining a threat number for the target vehicle 200 and performing a collision avoidance action to avoid a collision with the target vehicle 200. For example, the threat number can be a brake threat number BTN and the collision avoidance action can be actuating a brake 120 to slow or stop the host vehicle 101.

In the block 440, the computer 105 determines whether to continue the process 400. For example, the computer 105 can determine to continue the process 400 when the host vehicle 101 is continuing along a route. If the computer 105 determines to continue, the process 400 returns to the block 405. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    predict a heading angle between a host vehicle and a target vehicle;
    predict a lateral distance between a host vehicle and a lateral center line of the target vehicle and a longitudinal distance between the host vehicle and a longitudinal center line of the target vehicle based on the predicted heading angle;
    perform a threat assessment for the target vehicle when the lateral distance is below a lateral distance threshold and the longitudinal distance is below a longitudinal distance threshold, wherein the thresholds are determined based on a length and a width of the target vehicle; and
    upon performing the threat assessment, actuate one or more components of the host vehicle.

2. The system of claim 1, wherein the lateral center line and the longitudinal center line intersect at a center of the target vehicle.

3. The system of claim 1, wherein the instructions further include instructions to determine respective distances between a plurality of points on the host vehicle and the center line of the target vehicle.

4. The system of claim 3, wherein the plurality of points are corner points of the host vehicle.

5. The system of claim 3, wherein the instructions further include instructions to perform the threat assessment when at least one of the plurality of points has a respective distance that is below the threshold.

6. The system of claim 1, wherein the instructions further include instructions to identify a plurality of target vehicles, to determine respective distances between the host vehicle and each of the plurality of target vehicles, and to perform threat assessments on target vehicles having distances below the threshold.

7. A method, comprising:
    predicting a heading angle between a host vehicle and a target vehicle;
    predicting a lateral distance between a host vehicle and a lateral center line of the target vehicle and a longitudinal distance between the host vehicle and a longitudinal center line of the target vehicle based on the predicted heading angle;
    performing a threat assessment for the target vehicle when the lateral distance is below a lateral distance threshold and the longitudinal distance is below a longitudinal distance threshold, wherein the thresholds are determined based on a length and a width of the target vehicle; and
    upon performing the threat assessment, actuating one or more components of the host vehicle.

8. The method of claim 7, further comprising determining respective distances between a plurality of points on the host vehicle and the center line of the target vehicle.

9. The method of claim 8, wherein the plurality of points are corner points of the host vehicle.

10. The method of claim 8, further comprising performing the threat assessment when at least one of the plurality of points has a respective distance that is below the threshold.

11. A system, comprising:
    a host vehicle including a brake, a steering component, and a propulsion;
    means for predicting a heading angle between a host vehicle and a target vehicle;
    means for predicting a lateral distance between a host vehicle and a lateral center line of the target vehicle and a longitudinal distance between the host vehicle and a longitudinal center line of the target vehicle based on the predicted heading angle;
    means for performing a threat assessment for the target vehicle when the lateral distance is below a lateral distance threshold and the longitudinal distance is below a longitudinal distance threshold, wherein the thresholds are determined based on a length and a width of the target vehicle; and
    means for, upon performing the threat assessment, actuating at least one of the brake, the steering component, and the propulsion of the host vehicle.

12. The system of claim 11, further comprising means for determining respective distances between a plurality of points on the host vehicle and the center line of the target vehicle.

13. The system of claim 12, wherein the plurality of points are corner points of the host vehicle.

14. The system of claim 12, further comprising means for performing the threat assessment when at least one of the plurality of points has a respective distance that is below the threshold.

* * * * *